(12) United States Patent
Saito

(10) Patent No.: US 11,523,061 B2
(45) Date of Patent: Dec. 6, 2022

(54) IMAGING APPARATUS, IMAGE SHOOTING PROCESSING METHOD, AND STORAGE MEDIUM FOR PERFORMING CONTROL TO DISPLAY A PATTERN IMAGE CORRESPONDING TO A GUIDELINE

(71) Applicant: CANON KABUSHIKI KAISHA, Tokyo (JP)

(72) Inventor: Satoko Saito, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/351,919

(22) Filed: Jun. 18, 2021

(65) Prior Publication Data

US 2021/0409611 A1    Dec. 30, 2021

(30) Foreign Application Priority Data

Jun. 24, 2020 (JP) .............................. JP2020-108404

(51) Int. Cl.
*H04N 5/232* (2006.01)
(52) U.S. Cl.
CPC ... *H04N 5/232935* (2018.08); *H04N 5/23203* (2013.01); *H04N 5/23222* (2013.01); *H04N 2201/0084* (2013.01)
(58) Field of Classification Search
CPC ......... H04N 5/232935; H04N 5/23203; H04N 5/23222; H04N 2201/0084; H04N 5/225; H04N 5/142; G06T 7/68; G06V 10/42; G06V 20/00
See application file for complete search history.

(56) References Cited

U.S. PATENT DOCUMENTS

| 10,447,926 | B1* | 10/2019 | Brailovskiy | ....... H04N 5/23238 |
| 11,138,776 | B2* | 10/2021 | Mech | ........................ G06T 7/97 |
| 2008/0126942 | A1* | 5/2008 | Lee | ........................ G06F 16/58 |
| | | | | 715/730 |
| 2012/0154608 | A1* | 6/2012 | Ko | ........................ G11B 27/034 |
| | | | | 348/207.11 |
| 2012/0200738 | A1* | 8/2012 | Iwasaki | ............ H04N 5/232935 |
| | | | | 348/231.2 |
| 2015/0098000 | A1* | 4/2015 | Gosangi | .................. G06T 11/60 |
| | | | | 348/333.02 |

(Continued)

FOREIGN PATENT DOCUMENTS

| JP | 2007166250 A | * | 6/2007 |
| JP | 2007166250 A | | 6/2007 |
| JP | 2012042720 A | | 3/2012 |

*Primary Examiner* — Antoinette T Spinks
(74) *Attorney, Agent, or Firm* — Canon U.S.A., Inc. IP Division

(57) ABSTRACT

An apparatus includes a processor; and a memory storing a program which, when executed by the processor, causes the apparatus to: display, on a screen, a live view image obtained by executing imaging processing; set a guideline in response to an operation performed by a user; perform control so as to display, on the screen, a pattern image corresponding to the set guideline while superimposing the pattern image on the live view image; generate an image obtained by the imaging processing in accordance with a shooting instruction; and store, in a storage unit, the generated image in association with attribute information related to the set guideline.

10 Claims, 11 Drawing Sheets

(56) References Cited

U.S. PATENT DOCUMENTS

| | | | |
|---|---|---|---|
| 2015/0169994 A1* | 6/2015 | Chinen | G06F 16/5854 |
| | | | 382/218 |
| 2015/0256568 A1* | 9/2015 | Osmond | G06Q 50/01 |
| | | | 715/753 |
| 2016/0203264 A1* | 7/2016 | Danner | G06K 9/4609 |
| | | | 382/128 |
| 2017/0115853 A1* | 4/2017 | Allekotte | G06K 9/00456 |
| 2018/0205945 A1* | 7/2018 | Meyassed | G06T 7/0002 |
| 2019/0320113 A1* | 10/2019 | Rajvanshi | G06K 9/00664 |
| 2020/0242815 A1* | 7/2020 | Szczykutowicz | A61B 6/5294 |
| 2020/0394432 A1* | 12/2020 | Takeishi | G06K 9/00449 |
| 2021/0119714 A1* | 4/2021 | Kowal | G06F 16/9024 |
| 2021/0319517 A1* | 10/2021 | Aringdale | G06F 3/04842 |
| 2021/0319607 A1* | 10/2021 | Chang | G06T 7/73 |
| 2021/0319881 A1* | 10/2021 | Sasada | G06T 7/0012 |

\* cited by examiner

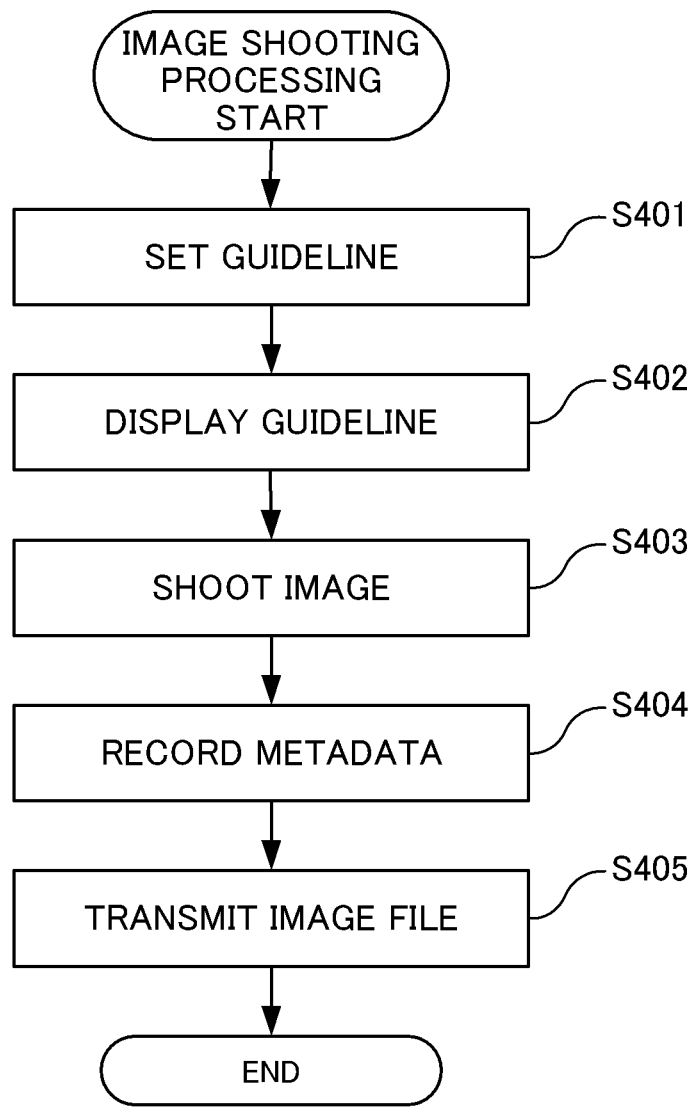

FIG.5A

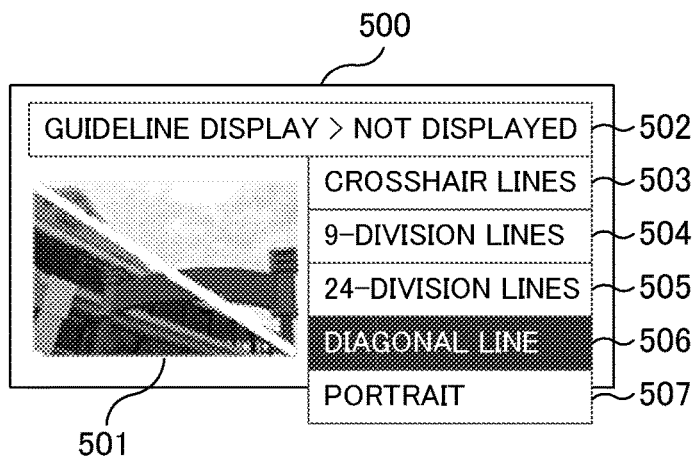

FIG.5B

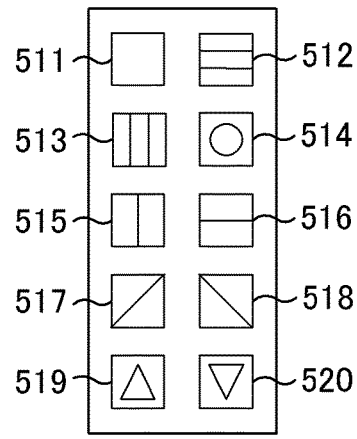

FIG.5C

| GUIDELINE SETTING | COMPOSITION |
|---|---|
| 9-DIVISION LINES | 3 DIVISIONS (VERTICAL) |
| 9-DIVISION LINES | 3 DIVISIONS (HORIZONTAL) |
| 24-DIVISION LINES | 2 DIVISIONS (VERTICAL) |
| 24-DIVISION LINES | 2 DIVISIONS (HORIZONTAL) |
| DIAGONAL LINE | DIAGONAL COMPOSITION (UPPER RIGHT/LOWER LEFT) |
| DIAGONAL LINE | DIAGONAL COMPOSITION (UPPER LEFT/LOWER RIGHT) |
| DIAGONAL LINE | CENTERED CIRCLE |
| PORTRAIT | CENTERED CIRCLE |
| BLURRING | CENTERED CIRCLE |
| CROSSHAIR LINES | CENTERED CIRCLE |

- 800
- 802 GUIDELINE DISPLAY > NOT DISPLAYED
- 803 CROSSHAIR LINES
- 804 9-DIVISION LINES
- 805 24-DIVISION LINES
- 806 DIAGONAL LINE
- 807 9-DIVISION LINES AND DIAGONAL LINE
- 801

| | | 810 |
|---|---|---|
| 811 | MODEL NAME OF IMAGING APPARATUS | YYYY |
| 812 | CROSSHAIR LINES | PATH OF THUMBNAIL |
| 813 | 9-DIVISION LINES | PATH OF THUMBNAIL |
| 814 | 24-DIVISION LINES | PATH OF THUMBNAIL |
| 815 | DIAGONAL LINE | PATH OF THUMBNAIL |
| 816 | 9-DIVISION LINES AND DIAGONAL LINE | PATH OF THUMBNAIL |

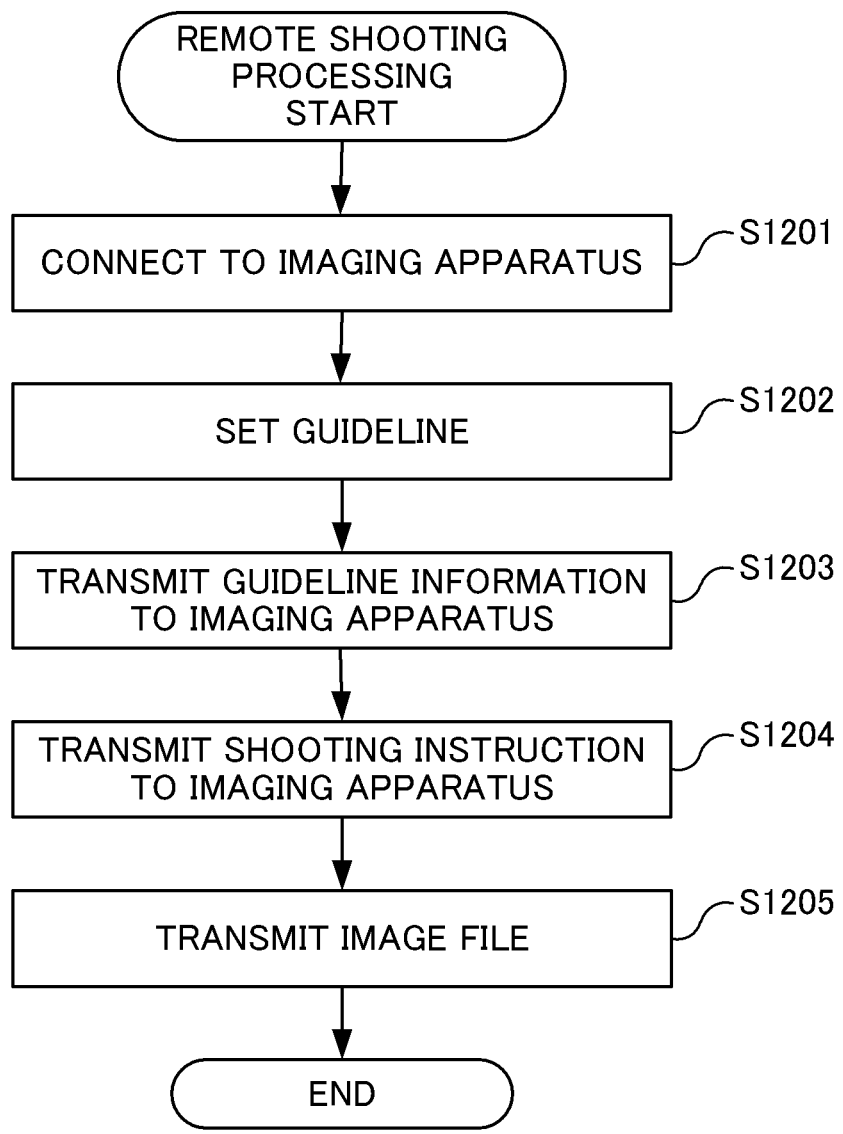

IMAGING APPARATUS, IMAGE SHOOTING PROCESSING METHOD, AND STORAGE MEDIUM FOR PERFORMING CONTROL TO DISPLAY A PATTERN IMAGE CORRESPONDING TO A GUIDELINE

BACKGROUND OF THE DISCLOSURE

Field of the Disclosure

The aspect of the embodiments relates to an imaging apparatus, an image shooting processing method, and a storage medium.

Description of the Related Art

In recent years, the spread of digital cameras, digital camcorders, smartphones, and so on, has made it possible for anyone to easily shoot images. In addition, the spread of social network services (SNS) has made it possible for users to readily share the content obtained by the shooting, over the Internet.

For this reason, there is a growing demand to shoot and upload beautiful and attractive images. Sites are provided on the Web where users upload shot images and describe their shooting techniques.

For example, Japanese Patent Application Publication No. 2007-166250 discloses, as a technology for supporting shooting techniques, a technology in which a composition template, which is referenced when a composition of a subject is determined, is displayed while being superimposed on the composition template on an image of the subject. Japanese Patent Application Publication No. 2012-42720 discloses a technology in which a parting line is detected from a distribution of pixel information regarding an image, and the composition of the image is classified into a composition pattern based on the degree of symmetry.

Even if a user shoots an image while elaborating the composition by using a composition template or the like, it is difficult to view the shot image and describe the composition of the image while looking back on the situation when the image was shot and the intention of the composition. That is to say, if the user does not remember which composition template he used to shoot the image, it is difficult to describe the composition of the shot image later in an understandable manner. Moreover, even if the composition is analyzed from the distribution of pixel information regarding the shot image, the user's intention regarding the composition when the image was shot may not be reflected in the analysis result.

SUMMARY OF THE DISCLOSURE

An apparatus of the aspect of the embodiments includes a processor; and a memory storing a program which, when executed by the processor, causes the apparatus to: display, on a screen, a live view image obtained by executing imaging processing; set a guideline in response to an operation performed by a user; perform control so as to display, on the screen, a pattern image corresponding to the set guideline while superimposing the pattern image on the live view image; generate an image obtained by the imaging processing in accordance with a shooting instruction; and store, in a storage unit, the generated image in association with attribute information related to the set guideline.

Further features of the disclosure will become apparent from the following description of exemplary embodiments with reference to the attached drawings.

BRIEF DESCRIPTION OF THE DRAWINGS

FIG. 4 is a flowchart showing an example of image shooting processing according to Embodiment 1;

FIGS. 5A to 5C are diagrams illustrating guideline information according to Embodiment 1;

FIG. 12 is a flowchart showing an example of an operation of the PC according to Embodiment 2.

DESCRIPTION OF THE EMBODIMENTS

Hereinafter, embodiments of the disclosure will be described with reference to the drawings. The disclosure is not limited to the following embodiments, and can be changed as appropriate without departing from the gist of the disclosure. For example, the disclosure may be modified or changed as appropriate, depending on the configuration of an apparatus to which the disclosure is applied, and various conditions.

Embodiment 1

Figure 1:
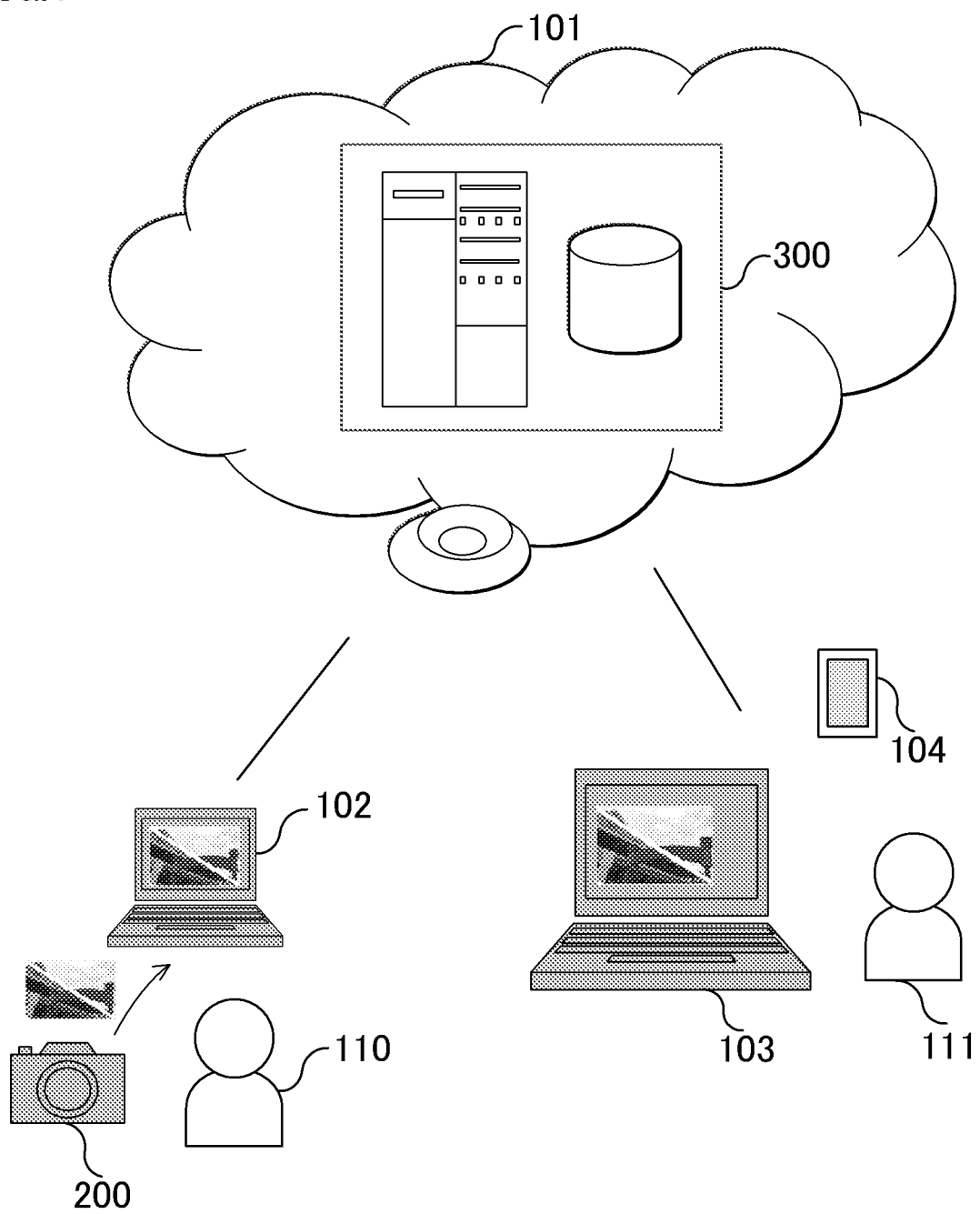
FIG. 1 is a diagram showing an example of a configuration of a system according to Embodiment 1.

System Configuration: FIG. 1 is a diagram showing an example of a configuration of a system according to Embodiment 1. A user 110, who is a photographer of an image, shoots the image using an imaging apparatus 200, such as a digital camera. The user 110 uploads the shot image to an information processing apparatus 300 via the Internet 101 by means of an application program for publishing images (hereinafter also referred to as an image-publishing application). The user 110 can upload images and input and publish a description of the image on a personal computer (PC) 102.

A browsing user 111, who browses images, accesses the information processing apparatus 300 via the Internet 101 using a PC 103 or a mobile device 104 such as a smartphone that serves as a display device. The browsing user 111 can browse the image by receiving and displaying the published image, the description of the composition thereof, or the like, using the PC 103.

Figure 2:
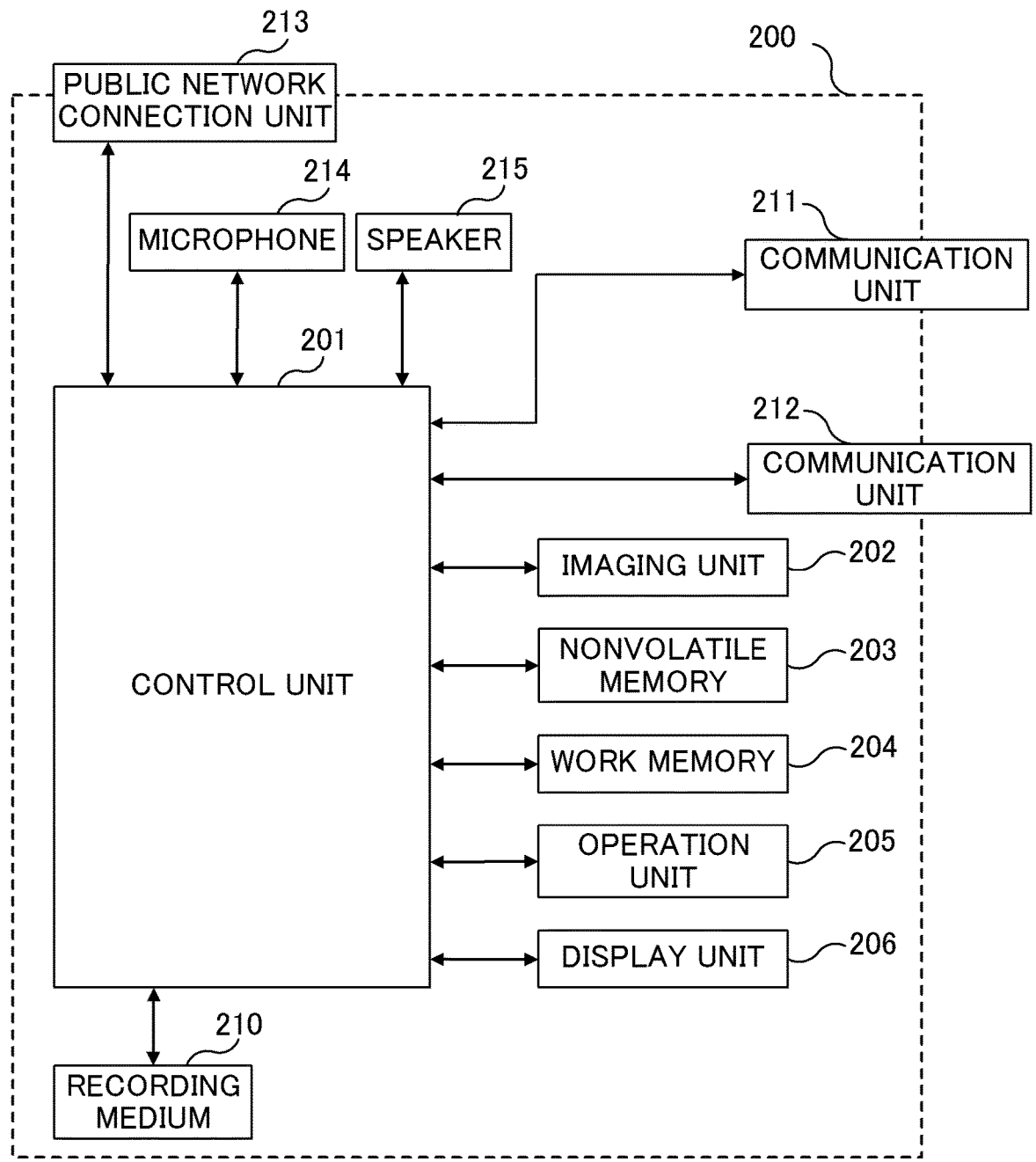
FIG. 2 is a diagram showing an example of a configuration of an imaging apparatus according to Embodiment 1.

Hardware Configuration of Imaging Apparatus: FIG. 2 is a diagram showing an example of a configuration of the imaging apparatus 200 according to Embodiment 1. The imaging apparatus 200 is an electronic device equipped with an imaging function, such as a camera, a smartphone, a tablet device, or a personal computer, for example.

A control unit 201 controls the entire imaging apparatus 200. The control unit 201 controls each part of the imaging apparatus 200 in accordance with an input signal and a program recorded in a nonvolatile memory 203. Note that a plurality of pieces of hardware, in place of the control unit 201, may alternatively control the entire imaging apparatus 200 by sharing processing.

An imaging unit 202 generates a digital signal by converting subject light formed by a lens unit to an analog electrical signal and performing A/D conversion on the analog electrical signal. The imaging unit 202 generates an image file by performing noise reduction processing or the like on the generated digital signal, and outputs the generated image file. The image file output from the imaging unit 202 is temporarily held in a work memory 204, which functions as a buffer memory. The control unit 201 performs predetermined image processing on the image file, and records the image file that has been subjected to the predetermined image processing on a recording medium 210.

The nonvolatile memory 203 is a nonvolatile memory on which data can be electrically recorded and from which data can be erased. The nonvolatile memory 203 records an OS (operating system), which is basic software that is executed by the control unit 201, and an application that realizes practical functions in cooperation with the OS. The nonvolatile memory 203 stores an application program for editing image files (hereinafter also referred to as an image-edition application).

The work memory 204 is used as a work memory for temporarily holding the image file output from the imaging unit 202 and displaying an image on a display unit 206. The work memory 204 is also used as a work area or the like for the control unit 201.

An operation unit 205 is used to accept an instruction given to the imaging apparatus 200 from the user. For example, the operation unit 205 includes a power button for the user to give an instruction to turn on or off a power supply of the imaging apparatus 200, and an operation member such as a touch panel provided on the display unit 206.

The touch panel, which is a part of the operation unit 205, can detect contact with the display unit 206. The touch panel can be integrally configured with the display unit 206. For example, the touch panel is configured such that the light transmission thereof does not interfere with a display on the display unit 206, and is attached to an upper layer of a display surface of the display unit 206. Input coordinates on the touch panel are associated with display coordinates on the display unit 206. Thus, a GUI is realized that makes the user feel as if the user can directly operate a screen displayed on the display unit 206. The control unit 201 can detect the following operations made to the touch panel, or the state thereof:

a finger or a pen coming into contact with the touch panel (hereinafter referred to as a "touch-down");

a state where the touch panel is touched with a finger or a pen (hereinafter referred to as a "touch-on");

a finger or a pen moving in contact with the touch panel (hereinafter referred to as a "move");

a finger or a pen that has been in contact with the touch panel being detached therefrom (hereinafter referred to as a "touch-up"); and a state where nothing is in contact with the touch panel (hereinafter referred to as a "touch-off").

The control unit 201 is notified, through an internal bus, of these operations and states, as well as the position coordinates at which a finger or a pen is in contact with the touch panel, and the control unit 201 determines what kind of operation has been performed on the touch panel based on the information of which the control unit 201 has been notified. As for a move, the moving direction of a finger or a pen moving on the touch panel can also be determined separately for a vertical component and a horizontal component on the touch panel, based on a change in the position coordinates.

A flick refers to an operation to quickly move a finger by a certain distance in contact with the touch panel and then detach the finger. In other words, a flick is an operation to quickly move on the touch panel as if the finger bounces off the touch panel. If a move performed over a predetermined distance or more at a predetermined speed or more is detected, and subsequently a touch-up is detected, it can be determined that a flick has been performed.

A drag refers to an operation to make a move by a predetermined distance or more at less than a predetermined speed. A tap operation refers to an operation to lightly tap the touch panel with a finger or a pen. The touch panel may be of any of various types, such as a resistive film type, a capacitive type, a surface acoustic wave type, an infrared type, an electromagnetic induction type, an image recognition type, and an optical sensor type.

The display unit 206 displays image data, characters for interactive operation, or the like. Note that the imaging apparatus 200 does not need to include the display unit 206. In this case, the imaging apparatus 200 is to be connected to an external device that has a display unit, and have a display control function of controlling display processing for the display unit of the external device.

The recording medium 210 can record the image file and the like. The recording medium 210 may be removable from the imaging apparatus 200, or may be built in the imaging apparatus 200. That is to say, the imaging apparatus 200 is to have means for at least accessing the recording medium 210. Note that the image file (a file of a shot image) includes metadata (meta information), thumbnail image data, original image data (shot image), or the like. The original image data is, for example, RAW data, or JPEG data with a larger size than the thumbnail image data.

A communication unit 211 is an interface for connecting to an external device. The imaging apparatus 200 can exchange data with the external device via the communication unit 211. The communication unit 211 is, for example, an antenna. The control unit 201 can connect to the external device via the antenna. The communication unit 211 is a so-called wireless LAN conforming to the IEEE 802.11 standard and includes an interface for communicating with the external device. The control unit 201 realizes wireless communication with the external device by controlling the communication unit 211. Note that the communication method used by the communication unit 211 is not limited to a wireless LAN, and may also include an infrared communication method, for example.

A communication unit 212 is an interface for connecting to an external device. The imaging apparatus 200 can exchange data with the external device via the communication unit 212. For example, the external device can receive the image file generated by the imaging apparatus 200 via the communication unit 212. The communication unit 212 is so-called Bluetooth (registered trademark) conforming to the IEEE 802.15.1 standard and includes an interface for communicating with the external device. The control unit 201 realizes wireless communication with the external device by controlling the communication unit 212. Note that the communication method is not limited to Bluetooth, and may also include a wireless LAN that is known as the IEEE 802.11 standard, or an infrared communication method, for example. Connection between the imaging apparatus 200 and external devices is not limited to wireless connection, and may alternatively be wired connection. For example, the imaging apparatus 200 and external devices may be connected in a wired manner using a USB cable, an HDMI (registered trademark) cable, an IEEE 1394 cable, or the like.

A public network connection unit 213 is an interface used to perform public wireless communication. The imaging apparatus 200 that has a call function, such as a smartphone, can make calls to and communicate data with other devices via the public network connection unit 213. The control unit 201 realizes a voice call by inputting and outputting a voice signal via a microphone 214 and a speaker 215. The public network connection unit 213 is, for example, an antenna. The control unit 201 can connect to a public network via the public network connection unit 213. Note that the communication unit 211 and the public network connection unit 213 are not limited to being independent hardware configurations, and may be configured to share one antenna, for example.

Figure 3:
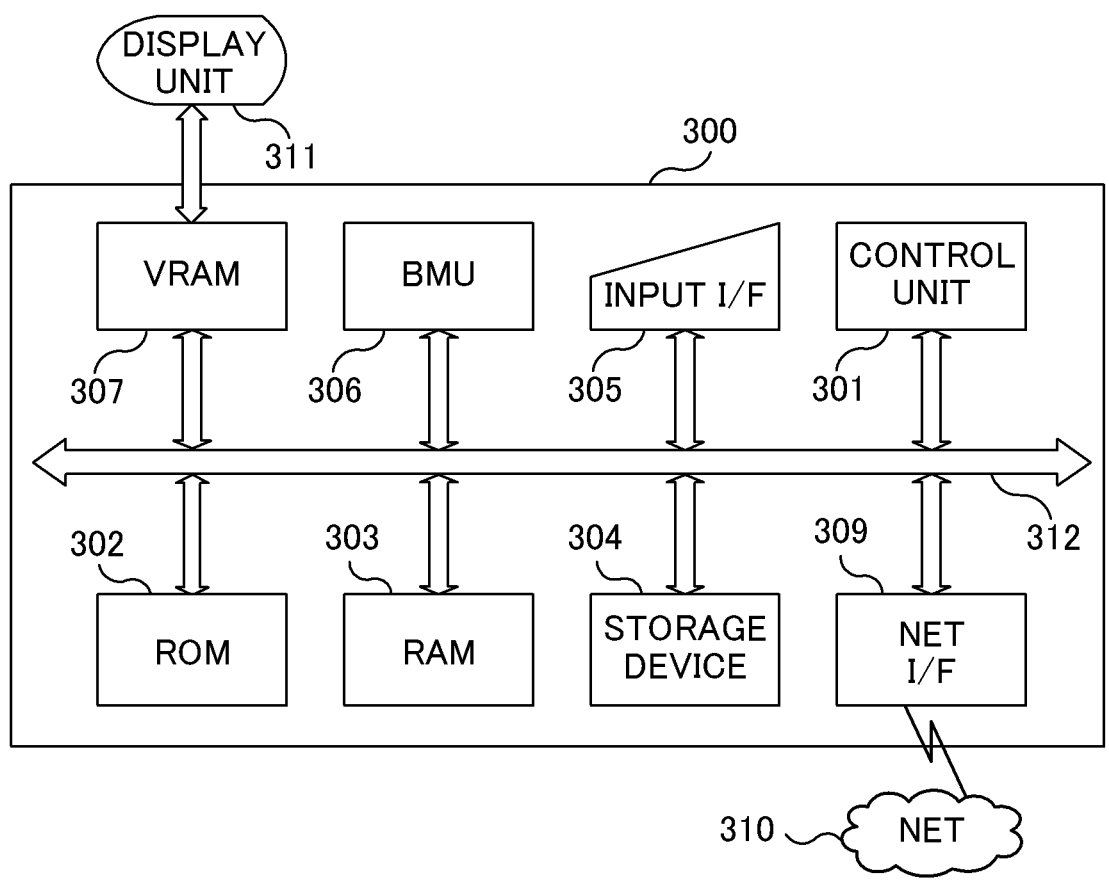
FIG. 3 is a diagram showing an example of a configuration of an information processing apparatus according to Embodiment 1.

Hardware Configuration of Information Processing Apparatus: FIG. 3 is a diagram showing an example of a configuration of the information processing apparatus 300 according to Embodiment 1. The information processing apparatus 300 may be realized by a single computer device, or may be realized by distributing functions thereof to a plurality of computer devices. In the case where the information processing apparatus 300 is constituted by a plurality of computer devices, the computer devices are communicably connected to each other by a communication line such as a Local Area Network (LAN).

A control unit 301 controls the entire information processing apparatus 300. The control unit 301 is a central processing unit (CPU), for example. A read only memory (ROM) 302 stores programs and parameters that are not changed. A random access memory (RAM) 303 temporarily stores programs and data that are supplied from an external device or the like.

A storage device 304 is a hard disk, a memory card, or the like that is installed in a fixed manner in the information processing apparatus 300, and stores programs such as an operating system (OS) and application software. The storage device 304 also stores an image file uploaded by the user, a description of a shot image that is input or edited by the user, or the like. The storage device 304 also stores information regarding guidelines for each model of the imaging apparatus 200.

An input interface 305 is an interface for connecting an input device such as a pointing device or a keyboard for accepting operations and data input from the user.

A bit move unit (BMU) 306 controls various kinds of data transfer, such as data transfer between memories and data transfer between memories and I/O devices. The data transfer between memories includes data transfer between a video RAM (VRAM) 307 and another memory, for example. The data transfer between memories and I/O devices includes data transfer between a memory and a network interface 309, for example.

The VRAM 307 is for recording an image to be displayed on the display unit 311. The image recorded on the VRAM 307 is displayed on the display unit 311 by being transferred to the display unit 311 in accordance with a predetermined requirement. Note that the display unit 311 may be an external display device. For example, each screen of application software is transmitted to the PC 102, the PC 103, or the mobile device 104 via the Internet 101, and is displayed on a display unit thereof.

The network interface 309 is an interface for connecting to an external device, such as the imaging apparatus 200, via a communication line 310 such as the Internet. A system bus 312 is used to transmit and receive signals between devices.

Image Shooting Processing: Image shooting processing will be described with reference to FIGS. 4 and 5A to 5C. The user can shoot an image while determining a composition using guidelines with the imaging apparatus 200. In the present embodiment, the guidelines are information for shooting assistance (hereinafter "shooting assistance information" or "attribute information") in the form of grid lines dividing a screen into a plurality of regions or any kind of line or pattern drawn in accordance with an operation performed by the user, the information being displayed on the display unit 206 of the imaging apparatus 200 during shooting preparation processing such that the user can readily determine the composition. The imaging apparatus 200 records guideline information, which indicates the guideline that the user uses to determine the composition, as metadata in the image file of a shot image. The image file in which the metadata is recorded is transmitted (uploaded) to the information processing apparatus 300. The metadata recorded in the image file is used to determine the composition of the shot image by the information processing apparatus 300. Note that the shooting assistance information is to be recorded in association with the image file and is not limited to metadata such as that mentioned above. The shooting assistance information may alternatively be recorded as data independent of the image file, in association with the image file.

FIG. 4 is a flowchart showing an example of an operation in the image shooting processing performed by the imaging apparatus 200. The image shooting processing shown in FIG. 4 is started after power is supplied to the imaging apparatus 200 and a shooting setting menu is displayed by the user using the operation unit 205.

In step S401, the control unit 201 sets a guideline to be used during the shooting preparation processing. Specifically, the control unit 201 sets any one of a plurality of guidelines in response to an operation performed by the user using the operation unit 205. The control unit 201 displays a guideline setting screen 500 shown in FIG. 5A, on the display unit 206.

The guideline setting screen 500 and information regarding the guideline used during the shooting preparation processing (hereinafter also referred to as "guideline information") will be described with reference to FIGS. 5A to 5C. FIGS. 5A to 5C are diagrams illustrating the guideline information in the imaging apparatus 200 according to Embodiment 1. Here, the guideline information refers to information that indicates types of guidelines, angles of lines representing the guidelines, the coordinates indicating the positions thereof, or the like. FIG. 5A shows an example of the guideline setting screen 500 of the imaging apparatus 200. The user sets a guideline to be used during the shooting preparation processing, on the guideline setting screen 500.

The user selects the type of guideline suitable for the compositions that the user wants to shoot from options, which are candidate settings 502 to 507 of the guideline display. The user can set the selected guideline as the guideline to be used in the shooting.

The candidate setting 502 is a setting in which no guideline is used. The candidate setting 503 is a setting in which a cross-shaped guideline is used. The candidate setting 504 is a setting in which nine-division guidelines are used. The candidate setting 505 is a setting in which 24-division guidelines are used. The candidate setting 506 is a setting in which a diagonal guideline is used. The candidate setting 507 is a setting in which a circle is displayed as a guideline for portraits at the center. Note that the candidate settings of guidelines are not limited to these six. The candidate settings of guidelines may also include a grid display that divides the screen with grid-like lines, a level line display, or the like.

A preview region 501 is a region for displaying a combined image obtained by combining a pattern image corresponding to the type of guideline set by the user with a sample image. In the example screen in FIG. 5A, the candidate setting 506, which is a diagonal line, is selected, and a pattern image corresponding to the diagonal-line guideline is combined with the sample image and is displayed in the preview region 501. The pattern image is, for example, an image of grid lines that divide the screen of the preview region 501, or a circle or a triangle displayed on the screen.

FIG. 5B is a diagram illustrating sample compositions prepared in the information processing apparatus 300. FIG. 5C is a diagram illustrating the correspondence relationship between the guidelines of the imaging apparatus 200 and the sample compositions of the information processing apparatus 300. Each sample composition is information indicating a composition of a shot image that is presented together with the shot image to the browsing user 111. The browsing user 111 can newly obtain a shot image with a composition similar to that of a desired shot image by shooting an image while referencing a sample composition.

The types of guidelines that the user uses in the shooting differ depending on the imaging apparatus 200. Meanwhile, the information processing apparatus 300 presents common sample compositions regardless of the model of the imaging apparatus 200 used in the shooting. To use the common sample compositions, the information processing apparatus 300 holds, in the storage device 304, information regarding the correspondence relationship between the candidate settings of guidelines prepared in each imaging apparatus 200 and the sample compositions.

FIG. 5B shows an example of a list of sample compositions prepared in the information processing apparatus 300. A composition 511 is for the case where no specific composition information exists. A composition 512 is a composition in which the screen is vertically divided into three parts. A composition 513 is a composition in which the screen is horizontally divided into three parts. A composition 514 is a centered composition, i.e., a composition in which the screen is divided by a circle arranged at the center. A composition 515 is a composition in which the screen is halved into left and right parts. A composition 516 is a composition in which the screen is halved into upper and lower parts. A composition 517 is a composition in which the screen is diagonally divided by a diagonal line from upper right to lower left. A composition 518 is a composition in which the screen is diagonally divided by a diagonal line from upper left to lower right. A composition 519 is a composition in which the screen is divided by a triangle arranged at the center. A composition 520 is a composition in which the screen is divided by an inverted triangle arranged at the center.

FIG. 5C is a correspondence table 530 that shows an example of the correspondence relationship between the guidelines provided in each imaging apparatus 200 and the sample compositions prepared in the information processing apparatus 300. The correspondence table 530 is defined for each model of the imaging apparatus 200 and is stored in the storage device 304 (storage unit). Candidate settings of guidelines that can be set in the imaging apparatus 200 are stored in a "guideline settings" column in the correspondence table 530. The types of compositions corresponding to the guideline settings of the imaging apparatus 200, of the types of sample compositions prepared in the information processing apparatus 300, are stored in a "composition" column.

For example, a diagonal guideline (candidate setting 506) of the imaging apparatus 200 is associated with the composition 517 in which the screen is diagonally divided by a diagonal line from upper right to lower left, the composition 518 in which the screen is diagonally divided by a diagonal line from upper left to lower right, and the centered composition 514 in which the screen is divided by a circle arranged at the center. The information processing apparatus 300 determines the composition of the shot image based on these correspondence relationships.

In step S402 in FIG. 4, the control unit 201 executes the shooting preparation processing to obtain a live view image, and displays a pattern image corresponding to the guideline set in step S401 on the display unit 206 while superimposing the pattern image on the live view image. The following image shooting processing will be described while assuming that a diagonal guideline has been set on the guideline setting screen 500. Note that, here, the shooting preparation processing refers to processing that is performed in the imaging apparatus 200 when a shutter button, which is included in the operation unit 205 of the imaging apparatus 200, is half-pressed. In the shooting preparation processing, an image sensor, an A/D conversion unit, and an optical system of the imaging unit 208 are controlled and autofocus processing and auto-exposure processing are performed, by the control unit 201. The shooting preparation processing also includes, for example, pre-flash processing, auto-white balance processing, anti-vibration processing, or the like.

The control unit 201 records, on the nonvolatile memory 203, information regarding the guideline that is set on the guideline setting screen 500 by the user. In the example in FIG. 5A, the control unit 201 records guideline information indicating a diagonal guideline on the nonvolatile memory 203.

The control unit 201 displays the live view image combined with the diagonal guideline set in step S402 on the display unit 206, which is a finder, a live view display screen, or the like. The user can view the composition of the entire live view image together with the guideline, and readily shoot an image with a desired composition by changing the subject's position in accordance with the guideline while changing the position of the imaging apparatus 200 and changing the zoom ratio.

In step S403, the control unit 201 executes imaging processing. Here, the imaging processing refers to processing that is performed when the shutter button included in the operation unit 205 of the imaging apparatus 200 is fully pressed. In the imaging processing, analog data output from the image sensor is converted to digital data by the A/D conversion unit in the imaging unit 202, thereafter compression processing or the like is executed to generate shot image data, and an image file that includes this shot image data is recorded on the work memory 204. Note that the pattern image of the guideline displayed in a superimposed manner during the shooting preparation processing is not combined in the shot image data.

In step S404, the control unit 201 records information regarding the imaging apparatus 200, shooting information such as the date and time of the shooting, and the guideline information, as metadata of the image file recorded on the work memory 204. That is to say, the image file includes information regarding the type of imaging apparatus 200 and the type of guideline used during the shooting preparation processing. The control unit 201 also records a thumbnail image of the shot image as metadata in the image file. The control unit 201 then saves the image file in which the metadata is recorded, to the recording medium 210.

In step S405, the control unit 201 accepts an instruction to upload the image from the user using the operation unit 205, and uploads (transmits) the image file in which the metadata is recorded to the information processing apparatus 300. The control unit 201 may upload, to the information processing apparatus 300, the image file that includes the metadata recorded on the work memory 204 or the recording medium 210. The control unit 201 can upload the image file to the information processing apparatus 300 from the communication unit 211 or the public network connection unit 213 via the Internet. After completing the uploading of the image file, the image shooting processing shown in FIG. 4 ends. Note that the control unit 201 may connect to the PC 102 via the communication unit 211 and transmit the image file thereto, and the PC 102 may upload the image file to the information processing apparatus 300. If the same guideline is to be used again in the next shooting preparation processing, the guideline setting in step S401 does not need to be newly made, and in step S402, the pattern image corresponding to the previously set guideline is displayed while being superimposed on a live view image. Then, if, in step S403, the imaging processing is executed, in step S404, information regarding the guideline used during the shooting preparation processing is recorded as metadata of the shot image in the image file.

Image-Publishing Preparation Processing: Image-publishing preparation processing will be described with reference to FIG. 6. In the image-publishing preparation processing, the information processing apparatus 300 analyzes an uploaded image file and determines the composition of the shot image based on the guideline information. The user can readily look back on the composition intended at the time of the shooting from the result of determining the composition by the information processing apparatus 300, and can input information regarding the composition of the shot image. After the user has completed inputting a description of the composition, the information processing apparatus 300 publishes the shot image that is allowed to be published and information regarding the composition of the shot image by distributing the shot image and the information to other users' PCs via a network.

Figure 6:
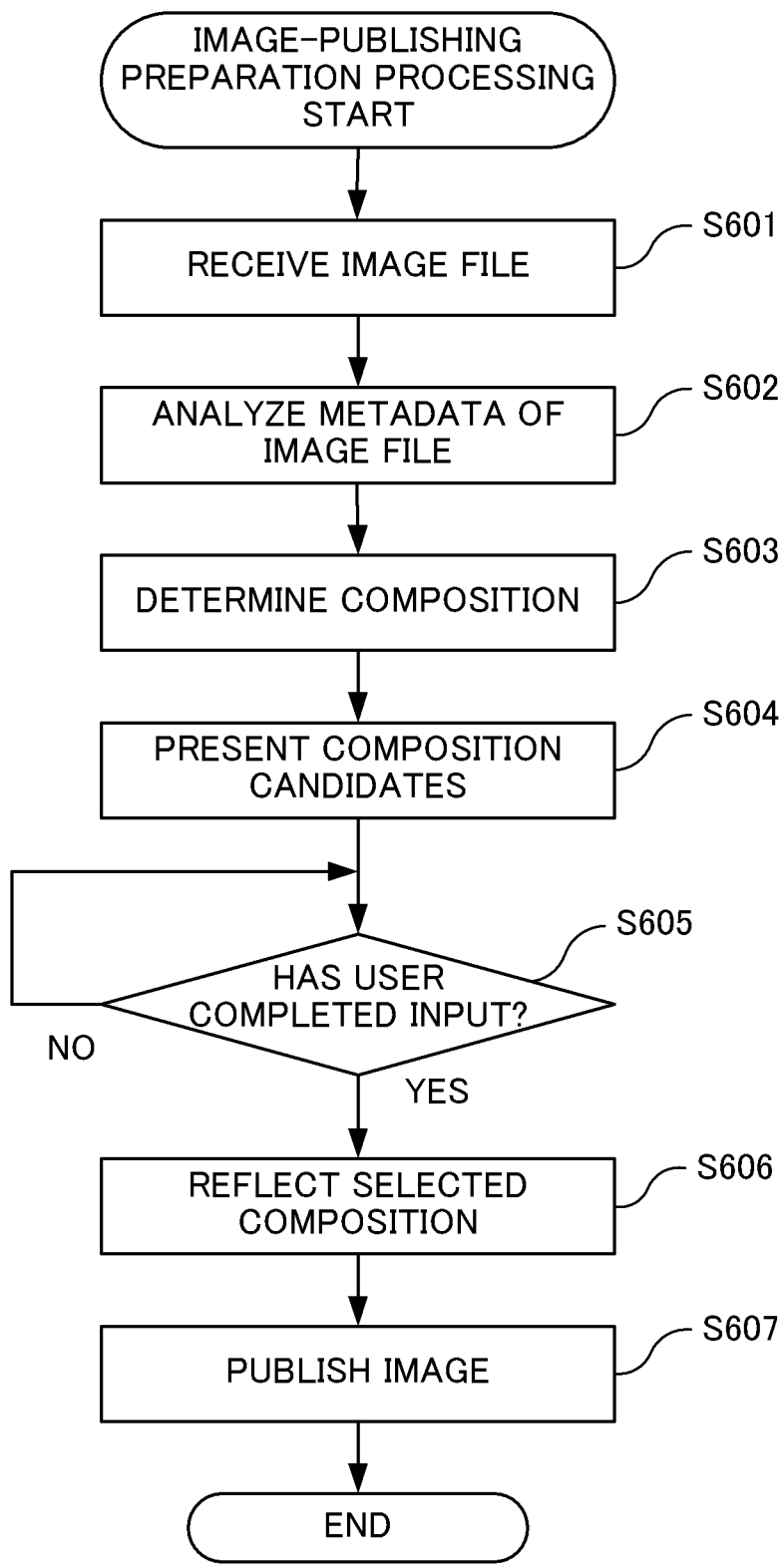
FIG. 6 is a flowchart showing an example of image-publishing preparation processing according to Embodiment 1.

FIG. 6 is a flowchart showing an example of the image-publishing preparation processing performed by the information processing apparatus 300 according to Embodiment 1. The control unit 301 of the information processing apparatus 300 loads predetermined application software from the storage device 304 to the RAM 303 and starts the software. The control unit 301 references the image file, the correspondence table 530, and so on, on the RAM 303 and executes the image-publishing preparation processing, in accordance with an instruction from the predetermined application software. The image-publishing preparation processing shown in FIG. 6 starts upon an instruction to publish an image from the user being accepted by the operation unit 205.

In step S601, the control unit 301 receives the image file to be published from the imaging apparatus 200 or the PC 102 via a communication line such as the Internet 101. The control unit 301 records the received image file on the RAM 303.

In step S602, the control unit 301 analyzes the metadata recorded in the received image file. The control unit 301 obtains the information regarding the imaging apparatus 200, the guideline information, and the thumbnail image from the metadata of the image file. The control unit 301 records the information obtained from the metadata on the RAM 303.

Note that a description is given while assuming that the thumbnail image is generated by the imaging apparatus 200 in step S404 in FIG. 4 and recorded in the image file, but is not limited thereto. The thumbnail image may alternatively be generated using the shot image in the image file received by the information processing apparatus 300, rather than being generated in the imaging apparatus 200.

In step S603, the control unit 301 determines the composition of the shot image based on the information obtained in step S602. Specifically, the control unit 301 obtains the type of imaging apparatus 200 from the information regarding the imaging apparatus 200 recorded on the RAM 303. The control unit 301 references the correspondence table 530 corresponding to the type of imaging apparatus 200, and obtains a candidate for a sample composition corresponding to the guideline information as the determination result. That is to say, in step S603, the control unit 301 determines the type of composition of the shot image.

In the correspondence table 530 shown as an example in FIG. 5C, if the guideline used during the shooting preparation processing is a diagonal guideline, candidates for the sample composition are the centered composition 514, a diagonal composition (upper right/lower left) 517, and a diagonal composition (upper left/lower right) 518.

In step S604, the control unit 301 displays a composition information input screen on the display unit 311, and displays the candidate for the sample composition obtained as the determination result in step S603 in a mode in which the candidate can be identified as an assumed composition of the shot image. Thus, the control unit 301 can present the candidate for the sample composition so as to be understandable for the user. That is to say, the control unit 301 displays the assumed composition of the shot image as an initial value on the composition information input screen, based on the information regarding the imaging apparatus 200, the guideline information, and so on that are obtained from the metadata of the image file in step S602.

Figure 7:
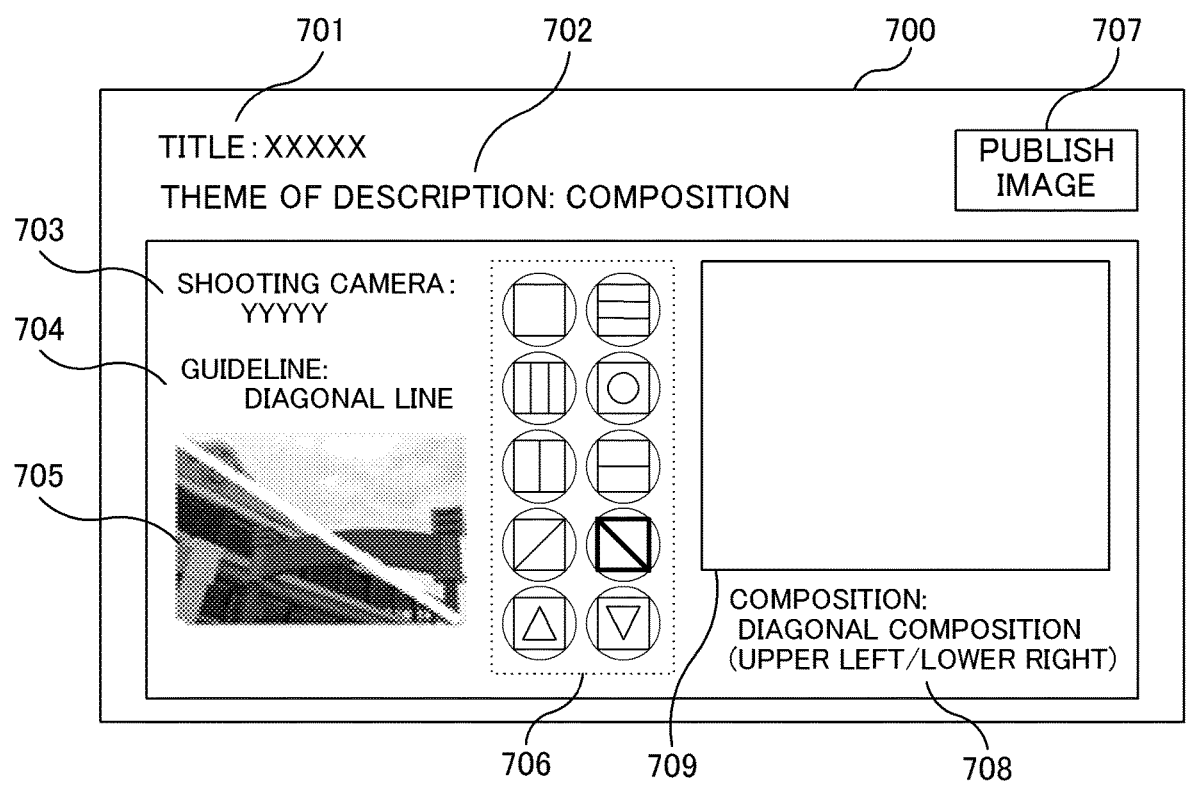
FIG. 7 shows an example of a composition information input screen according to Embodiment 1.

FIG. 7 shows an example of a composition information input screen 700 of the information processing apparatus 300 according to Embodiment 1. The composition information input screen 700 is a screen for the user to input information regarding the composition of the image to be published. The information regarding the imaging apparatus 200 and the guideline information obtained in step S602 are displayed in advance on the composition information input screen 700. The user can reference the content displayed on the composition information input screen 700 and edit and input the information regarding the composition of the shot image to be published.

A title 701 is a field for inputting a title of the image to be published. A file name of the image file may be displayed as an initial value of the title 701. A description theme 702 is a display of the type of shooting assistance information that describes the shot image to be published. In the composition information input screen 700, "composition" is displayed as the description theme 702.

A shooting camera 703 is a display of a model name of a shooting device with which the shot image was shot. The model name of the shooting device can be obtained from the information regarding the imaging apparatus 200 that is obtained from the metadata of the image file in step S602.

A guideline 704 is a display of the type of guideline used to shoot the shot image. The type of guideline is included in the guideline information obtained from the metadata of the image file in step S602.

An image display region 705 is a display of a combined image obtained by combining a thumbnail of the shot image and a pattern image that represents a composition selected in a sample composition list 706. Note that pattern images that represent sample compositions are recorded in advance in the storage device 304.

The sample composition list 706 is a display of a list of sample compositions provided by the information processing apparatus 300. The sample composition list 706 is displayed in a state where the composition (candidate for the sample composition) of the shot image that is determined in step S603 is selected as an initial value. The selected composition can be presented so as to be able to be identified by the user by being emphasized with thick lines as shown in FIG. 7, for example. The user can input a description of the composition used during the shooting while referencing the presented sample composition, and can change the selection of the sample composition to another one in the sample composition list 706. Note that if the user changes the selection in the sample composition list 706, the changed composition is recorded in association with the shot image on the RAM 303 (storage device 304).

Note that if there are a plurality of candidates for the sample composition determined in step S603, the sample composition list 706 is displayed such that any one of the plurality of compositions can be selected and it can be understood that other candidates are also available. For example, the other candidates may be flashed in addition to emphasis with thick lines. Compositions that are not included in the candidates for the sample composition may be grayed out such that these compositions cannot be selected, for the purpose of input assistance in the composition selection by the user. As for the compositions displayed in a selectable state, of the plurality of candidates, for example, the composition of the shot image may be analyzed based on a distribution of pixel values of the shot image, and a sample composition with the highest degree of matching with the analyzed composition may be displayed in a selectable state.

An image publish button 707 is an operation button for the user to give an instruction to publish an image. A composition 708 is a display of the type name of the composition selected in the sample composition list 706. A description input field 709 is a field for the user to input a description of the intention of the composition at the time of the shooting, the relationship between the subject and the composition, or the like. The user can readily look back on the intension of the composition at the time of the shooting based on the candidate for the sample composition selected as an initial value in the sample composition list 706. Accordingly, the user can input an appropriate description regarding the composition for the shot image to be published.

In step S605 in FIG. 6, the control unit 301 monitors the input state of the sample composition list 706, and waits for input regarding the composition from the user. The control unit 301 determines whether or not the user has completed the input. For example, if the user has made no operation to the sample composition list 706 for a predetermined period, or if the selected composition is changed, the control unit 301 can determine that the user has completed the input. A configuration may also be employed in which a button (not shown) for giving an instruction to complete composition selection is displayed on the composition information input screen 700, and the control unit 301 determines that the user has completed the input if an operation to the button for giving an instruction to complete composition selection has been accepted. After the user has completed the input, the control unit 301 records information regarding the selected composition on the RAM 303. If the user has completed the input, the processing proceeds to step S606, and whether if the user has not completed the input, the processing returns to step S605.

In step S606, the control unit 301 emphasized the displayed composition selected by the user if the composition has been changed in the sample composition list 706 in step S605. The control unit 301 also combines the thumbnail of the image displayed in the image display region 705 with a pattern image that represents the changed composition, and displays the combined image in the image display region 705. The control unit 301 also displays, as the composition 708, the type of composition selected in the sample composition list 706.

In step S607, if an operation to the image publish button 707 has been accepted, the control unit 301 stores, in the storage device 304, information regarding the shot image and the description of the composition in association with information indicating the state where publishing thereof is allowed. Note that if the user selects a composition other than the candidate from the sample composition list 706, the control unit 301 may display a warning and require the user to check the composition.

As described above, the control unit 301 sets the image, the description of the composition, and so on, to a publicly available state, and ends the image-publishing preparation processing shown in FIG. 6. If the image is required to be published by the PC 103 of a third party (browsing user 111), the information processing apparatus 300 can present information regarding the shot image and the description of the composition that are allowed to be published, to the user 111 by transmitting the information to the PC 103 via the network.

Note that if, in step S603, there are a plurality of candidates for the sample composition, and the user gives an instruction to publish an image without selecting any of the candidates, the control unit 301 may automatically select a candidate with the highest likelihood from the plurality of candidate compositions. For example, a configuration may also be employed in which a priority column is added to the correspondence table 530 shown in FIG. 5C, the priority of a sample composition is set for each type of guideline, and a candidate with the highest priority is automatically selected from a plurality of candidates. Also, the composition of the shot image may be analyzed from a distribution of pixel values thereof, and a candidate with the highest degree of matching with the analyzed composition may be automatically selected.

The control unit 301 determines the composition of the shot image based on the guideline information in step S603, but the disclosure is not limited thereto. For example, the control unit 301 may determine the composition of the shot image by combining pieces of information such as a face recorded in the image file and a guide frame that indicates the results of recognizing a human body and an object. Information used to determine the composition is to be recorded in the image file.

The determination of the composition is not limited to the case where the information processing apparatus 300 performs the determination in step S603. The composition of the shot image may alternatively be determined by the imaging apparatus 200. In this case, the imaging apparatus 200 can determine the composition of the shot image by holding the correspondence table 530 indicating the correspondence between settable guidelines and sample compositions in the recording medium 210. The image apparatus 200 records information regarding the determined composition in the image file. The information processing apparatus 300 can determine the composition of the shot image based on the information regarding the composition recorded in the image file in step S603.

Note that, in addition to the guideline information, shooting assistance information such as a distance measurement point and focus may also be recorded as metadata in the image file. The information processing apparatus 300 may determine the composition of the shot image based on not only the guideline information but also the shooting assistance information. The information processing apparatus 300 may also present, as the sample compositions, guidelines that can be set on the imaging apparatus 200 that the user 110 owns, as-is.

A description will be given, with reference to FIGS. 8A and 8B, of a guideline setting screen 800 and guideline information used during the shooting preparation processing that are displayed on the display unit 206 of the imaging apparatus 200. The user selects a guideline suitable for a composition that the user wants to shoot from options, which are candidate settings 802 to 807 of the guideline display. The user can set the selected guideline as the guideline to be used in the shooting.

The candidate setting 802 is a setting in which no guideline is used. The candidate setting 803 is a setting in which a cross-shaped guideline is used. The candidate setting 804 is a setting in which nine-division guidelines are used. The candidate setting 805 is a setting in which 24-division guidelines are used. The candidate setting 806 is a setting in which a diagonal guideline is used. The candidate setting 807 is a setting in which nine-division guidelines and a diagonal guideline are used in combination. Note that the candidate settings of guidelines are not limited to these six. The candidate settings of guidelines may also include six-division guidelines, and may also include a combination of a diagonal guideline and a cross-shaped line or 24-division guidelines.

A preview region 801 is a region for displaying a combined image obtained by combining a pattern image corresponding to the type of guideline set by the user with a sample image. In the example screen in FIG. 8A, the candidate setting 806, which is a diagonal line, is selected, and a pattern image corresponding to the diagonal guideline is combined with the sample image and is displayed in the preview region 801.

Figures 8A, 8B:
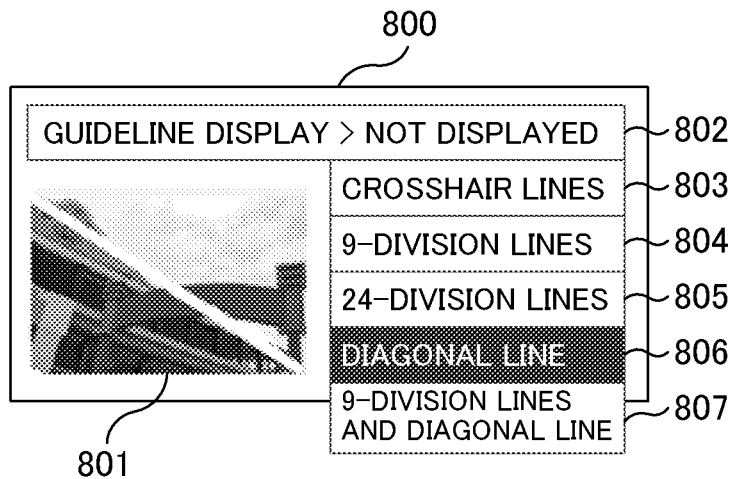
FIGS. 8A and 8B are diagrams illustrating guideline information according to Embodiment 1.

FIG. 8B is a diagram illustrating sample compositions of each imaging apparatus that are prepared in the information processing apparatus 300. The information processing apparatus 300 holds information regarding guidelines that can be set for each imaging apparatus 200. That is to say, the information processing apparatus 300 holds, in the storage device 304, information regarding guidelines of a plurality of imaging apparatuses 200.

A correspondence table 810 is a correspondence table that indicates destinations in which guideline information defined for each imaging apparatus 200 is stored. The correspondence table 810 is stored in the storage device 304 (storage unit). 811 denotes the model name of the imaging apparatus 200. Guidelines 812 to 816 are guidelines that can be set in the imaging apparatus 200. Guidelines 812 to 816 are associated with destinations (paths of the thumbnails) where the respective thumbnail information is stored. The thumbnail of an image of each guideline is displayed while being superimposed on the thumbnail image of the shot image on a composition information input screen, which will be described with reference to FIG. 9.

Note that the guideline information is not limited to the guidelines 812 to 816 shown in FIG. 8B. The guideline information may also include guidelines with a different number of divisions from those of the guidelines shown in FIG. 8B or a combination of a plurality of types of guidelines.

Figure 9:
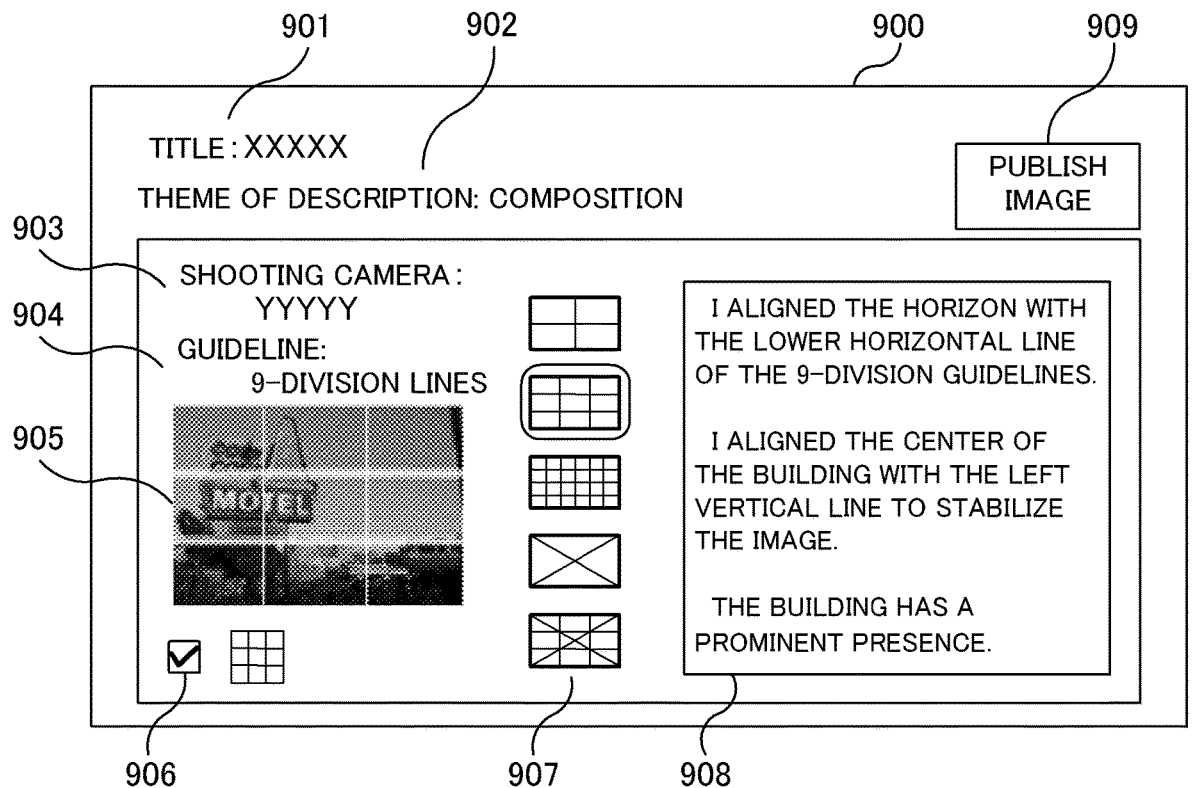
FIG. 9 shows another example of the composition information input screen according to Embodiment 1.

FIG. 9 shows an example of the composition information input screen 900 of the information processing apparatus 300. Information regarding the imaging apparatus 200, the guideline information, and so on, are displayed in advance on the composition information input screen 900. The user can reference the content displayed on the composition information input screen 900 and edit and input the description regarding the composition of the shot image to be published.

A title 901 is a field for inputting a title of the image to be published. A file name of the image file may be displayed as an initial value of the title 901. A description theme 902 is a display of the type of shooting assistance information that describes the shot image to be published. In the composition information input screen 900, "composition" is displayed as the description theme 902.

A shooting camera 903 is a display of a model name of a shooting device with which the shot image was shot. The model name of the shooting device can be obtained from the information regarding the imaging apparatus 200 obtained from the metadata of the image file.

A guideline 904 is a display of the type of guideline used during the shooting preparation processing for the shot image. The type of guideline is included in the guideline information obtained from the metadata of the image file. The type displayed as the guideline 904 is the type of guideline prepared in the model of the imaging apparatus 200 used in the shooting.

An image display region 905 is a display of an image obtained by combining a thumbnail of the shot image and an image of the guideline of the imaging apparatus 200 selected in the composition list 907. The thumbnail of the shot image is recorded in the image file generated using the shot image in the imaging apparatus 200.

A guideline display 906 indicates whether or not the user has used a guideline display during the shooting by placing or removing a checkmark in a checkbox. If a checkmark is placed in the guideline display 906, the guideline display 906 may also include a display of the information regarding the composition used next to the checkbox.

The composition list 907 is a display of a list of types of guidelines that can be set in the imaging apparatus 200. In the composition list 907, a guideline used during the shooting by the user is displayed in an emphasized manner. Information regarding the guidelines that can be set in the imaging apparatus 200 that are displayed in the composition list 907 is obtained from the correspondence table in FIG.

8B. The guideline used during the shooting preparation processing can be obtained from metadata of the image file.

A description input field 908 is a field for a description of the composition used during the shooting. The user can look back on the intention of the composition, the relationship between a subject and the composition, or the like from the guideline displayed in an emphasized manner in the composition list 907 (the guideline used in the shooting), and can input a supplementary description in detail. An image publish button 909 is an operation button for the user to give an instruction to publish an image.

Note that even if a guideline is used during the shooting preparation processing, the user can publish the shot image without displaying the guideline information and the composition based thereon by removing a checkmark of the guideline display 906. The composition list 907 is a list for presenting the guideline that has been actually used during the shooting preparation processing to the user, but if the actually used guideline does not fit the intention of the composition, the user can also change the guideline to a different one and publish the shot image.

Embodiment 2

Embodiment 2 is an embodiment in which processing for shooting an image while displaying a guideline on a finder or a live view image of an imaging apparatus is executed using an application for remote shooting (hereinafter also referred to as a remote shooting application) by a PC or the like that can communicate with the imaging apparatus.

Figure 10:
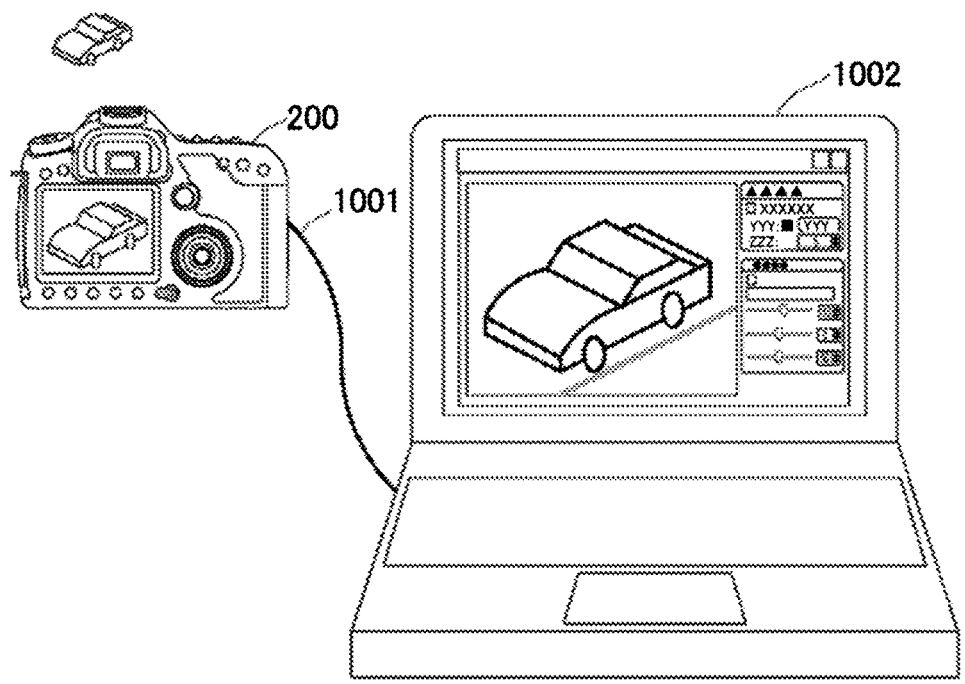
FIG. 10 is a diagram showing an example of a configuration of a system according to Embodiment 2.

System Configuration of Remote Shooting: FIG. 10 is a diagram showing a system configuration of remote shooting according to Embodiment 2. The remote shooting system includes the imaging apparatus 200 and a PC (personal computer) 1002. The PC 1002 and the imaging apparatus 200 are connected to each other by a cable 1001. The PC 1002 and the imaging apparatus 200 transmit and receive various data to and from each other via the cable 1001. The PC 1002 controls shooting performed by the imaging apparatus 200, using the remote shooting application. Note that the imaging apparatus 200 and the PC 1002 may be connected by means of wireless communication instead of the cable 1001.

The imaging apparatus 200 transmits a captured live view image to the PC 1002 via the cable 1001. The imaging apparatus 200 receives various instructions for controlling shooting from the PC 1002, and executes a shooting operation in accordance with the received instructions. The imaging apparatus 200 generates a shot image and records the generated image on a recording medium.

The PC 1002 receives the live view image from the imaging apparatus 200 via the cable 1001. The PC 1002 displays the received live view image on a display unit. The PC 1002 can display the shooting assistance information, such as the guideline information, while superimposing the shooting assistance information on the live view image. The PC 1002 can control the shooting processing by transmitting various instructions for controlling the shooting to the imaging apparatus 200. The PC 1002 is to include a display unit for displaying the image received from the imaging apparatus 200 and be able to control the image shooting processing performed by the imaging apparatus 200. The PC 1002 is not limited to a PC and may alternatively be an electronic device such as a smartphone or a tablet terminal.

Although FIG. 10 shows an example in which the PC 1002 and the imaging apparatus 200 are connected by the cable 1001, they may alternatively be connected by means of wireless communication or the like.

The entire system configuration of Embodiment 2 is the same configuration as that shown in FIG. 1 to which the PC 1002, which controls the imaging apparatus 200, is added. The hardware configurations of the imaging apparatus 200 and the information processing apparatus 300 are the same as those of Embodiment 1, and therefore a description thereof is omitted. Note that the PC 1002 may be realized by the same computer as the PC 102 that is used by the user 110, who is the photographer, to upload images, for example.

Figure 11:
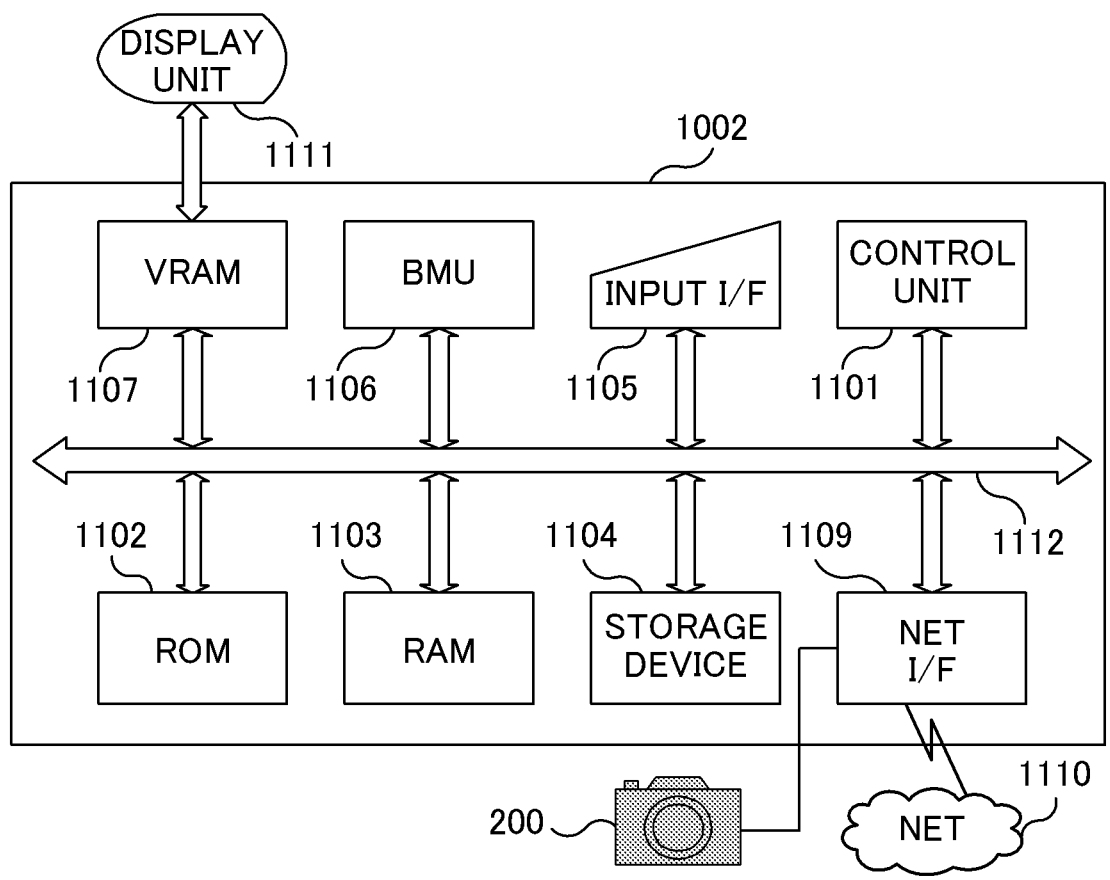
FIG. 11 is a diagram showing an example of a configuration of a PC according to Embodiment 2.

Hardware Configuration of Remote Shooting PC: FIG. 11 is a diagram showing an example of a configuration of the PC 1002 used in remote shooting according to Embodiment 2. The control unit 1101 controls the entire PC 1002. The control unit 1101 is, for example, a CPU. A ROM 1102 stores programs and parameters that are not changed. A RAM 1103 temporarily stores programs and data supplied from an external device or the like.

The storage device 1104 is a hard disk, a memory card, or the like that is installed in a fixed manner in the PC 1002, and stores an OS and programs such as the remote shooting application. An input interface 1105 is an interface for connecting an input device such as a pointing device or a keyboard for accepting operations and data input from the user.

A BMU 1106 controls various kinds of data transfer, such as data transfer between memories and data transfer between memories and I/O devices. The data transfer between memories includes data transfer between a video RAM (VRAM) 1107 and another memory, for example. The data transfer between memories and I/O devices includes data transfer between a memory and a network interface 1109, for example.

The VRAM 1107 is for recording an image to be displayed on the display unit 1111. The image recorded on the VRAM 1107 is displayed on the display unit 1111 by being transferred to the display unit 1111 in accordance with a predetermined requirement.

The network interface 1109 is an interface for connecting to an external device, such as the imaging apparatus 200, via a communication line 1110 such as the Internet. A system bus 1112 is used to transmit and receive signals between devices.

Remote Shooting Processing: A description will be given, with reference to FIG. 12, of remote shooting processing for setting a guideline using the remote shooting application that operates on the PC 1002 and controlling the imaging apparatus 200 to perform shooting. FIG. 12 is a flowchart showing an example of the remote shooting processing according to Embodiment 2. The remote shooting processing shown in FIG. 12 starts upon an instruction to start remote shooting being accepted from the user via the input interface 1105.

In step S1201, the control unit 1101 connects to the imaging apparatus 200 via the network interface 1109. In step S1202, the control unit 1101 displays a guideline setting screen on the display unit 1111. The user can set a grid display or a level line that partitions the screen as a guideline for the remote shooting on the guideline setting screen. The level line may be able to be set by an angle and coordinates. Upon accepting an instruction to set a guideline from the input interface 1105, the control unit 1101 records the set guideline information on the RAM 1103.

In step S1203, the control unit 1101 transmits the guideline information recorded on the RAM 1103 to the imaging apparatus 200 via the network interface 1109. In step S1204, upon accepting a shooting instruction from the input interface 1105, the control unit 1101 transmits a shooting instruction to the imaging apparatus 200 via the network interface 1109.

The imaging apparatus 200 that has received the shooting instruction from the PC 1002 executes the image shooting processing in response to the shooting instruction. The imaging apparatus 200 records, in the image file of the obtained image, a flag indicating that remote shooting has been executed and the guideline information, in addition to ordinary shooting information indicating the model of the imaging apparatus 200 and the date and time of the shooting, as metadata. Note that the imaging apparatus 200 may further record shooting assistance information such as a distance measurement point and a focus as metadata in the image file.

Note that the guideline information is not limited to being recorded in the image file by the imaging apparatus 200. For example, a configuration may alternatively be employed in which the PC 1002 (remote shooting application) receives the image file from the imaging apparatus 200 and records the guideline information as metadata of the image file.

In step S1205, after receiving the image file from the imaging apparatus 200, the control unit 1101 accepts an instruction to upload the image file from the user via the input interface 1105. The control unit 1101 uploads (transmits) the image file with the guideline information recorded as the metadata, to the information processing apparatus 300.

Embodiment 2 is realized by performing remote shooting as the image shooting processing in Embodiment 1. The image-publishing preparation processing according to Embodiment 2 is the same as that of Embodiment 1, and therefore a description thereof is omitted.

Although the disclosure has been described above in detail based on the exemplary embodiments, the disclosure is not limited to these specific embodiments, and various modes within the scope that do not deviate from the gist of the disclosure are also included in the disclosure. Portions of the above embodiments may also be combined as appropriate.

The disclosure also includes the case of supplying a software program that realizes the functions of the above embodiments from a recording medium to a system or a device that has a computer capable of executing the program, directly or by means of wired/wireless communication, and executing the program.

Accordingly, a program code itself that is supplied to and installed in a computer in order to realize the functional processing of the disclosure on a computer also realize the disclosure. That is to say, the computer program itself for realizing the functional processing of the disclosure is also included in the disclosure.

In this case, if the functions of the program are provided, any form of program, such as an object code, a program executed by an interpreter, or script data supplied to the OS, may be employed.

The recording medium for supplying the program may be, for example, a hard disk, a magnetic recording medium such as a magnetic tape, an optical/magneto-optical recording medium, or a nonvolatile semiconductor memory.

A possible method of supplying the program is a method in which a computer program that forms the disclosure is stored in a server on a computer network, and a connected client computer downloads and executes the computer program.

According to the disclosure, a composition intended by a photographer when shooting a shot image can be more accurately reproduced.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-108404, filed on Jun. 24, 2020, which is hereby incorporated by reference herein in its entirety.

What is claimed is:
1. A system comprising:
an imaging apparatus comprising:
a processor; and
a memory storing a program which, when executed by the processor, causes the imaging apparatus to:
display, on a screen of the imaging apparatus, a live view image obtained by executing imaging processing;
set a guideline in response to an operation performed by a user;
perform control to display a pattern image corresponding to the set guideline, by superimposing the pattern image on the live view image, on the screen
generate a shot image obtained by the imaging processing in accordance with a shooting instruction; and
store, in a storage unit, the shot image in association with attribute information related to the set guideline, and
an information processing apparatus comprising:
a processor; and
a memory storing a program which, when executed by the processor, causes the information processing apparatus to:

receive the shot image with the attribute information via a network;

analyze the attribute information;

determine composition of the shot image using the guideline, the guideline being the analyzed attribute information; and allow to publish the shot image with information of the determined composition, on the network.

2. The system according to claim 1, wherein the guideline is set in response to an operation performed by the user before the live view image is displayed on the screen of the imaging apparatus.

3. The system according to claim 1, wherein the set guideline is further displayed, after the shot image is stored in the storage unit, while being superimposed on a live view image displayed in shooting preparation processing for another image.

4. The system according to claim 1, wherein the guideline is set by being selected from a plurality of guidelines corresponding to a plurality of different pattern images in response to an operation performed by the user.

5. The system according to claim 1, wherein the pattern image is at least one of grid lines, a diagonal line, a cross-shaped line, any line drawn in accordance with an operation performed by the user, a circle and a triangle that divide the screen.

6. The system according to claim 1, wherein the attribute information is information indicating at least one of a type of the pattern image, coordinates or an angle indicating a position at which the image is displayed on the screen, information regarding distance measurement or a focus, and a result of recognizing a subject.

7. The system according to claim 1, wherein the program when executed by the processor, causes the apparatus to:

communicate with a computer;

receive an instruction to control imaging processing from the computer through the communicating;

transmit a live view image obtained by executing the imaging processing to the computer through the communicating;

receive attribute information related to a guideline corresponding to a pattern image displayed while being superimposed on the live view image;

generate a shot image file obtained by the imaging processing, in response to a shooting instruction; and store the shot image in association with attribute information.

8. The system according to claim 1, information of the determined composition indicates sample image corresponding to the attribute information, wherein the sample image has different description from the pattern image corresponding to the attribute information.

9. A method comprising:

displaying, on a screen of an imaging apparatus, a live view image obtained by executing imaging processing on a screen;

setting a guideline in response to an operation performed by a user;

performing control to display a pattern image corresponding to the set guideline, by superimposing the pattern image on the live view image, on the screen;

generating a shot image obtained by means of the imaging processing in accordance with a shooting instruction;

storing, in a storage unit, the shot image in association with attribute information related to the set guideline;

receiving the shot image with the attribute information via a network;

analyzing the attribute information;

determining composition of the shot image using the guideline, the guideline being the analyzed attribute information; and allowing to publish the shot image with information of the determined composition, on the network.

10. The method according to claim 9, further comprising:

communicating with a computer;

receiving an instruction to control imaging processing from the computer through the communicating;

transmitting a live view image obtained by executing the imaging processing to the computer through the communicating;

receiving attribute information related to a guideline corresponding to a pattern image displayed while being superimposed on the live view image;

generating a shot image file obtained by the imaging processing, in response to a shooting instruction; and storing the shot image in association with attribute information.

* * * * *